United States Patent Office 2,820,032
Patented Jan. 14, 1958

2,820,032

PREPARATION OF TRIAZINES

Eugene F. Hill, Birmingham, and Ernest Clinton, Huntington Woods, Mich.

No Drawing. Application April 21, 1954
Serial No. 424,766

3 Claims. (Cl. 260—249.5)

This invention relates to the preparation of substituted triazines and more particularly to a new and improved process for the preparation of s-triazines substituted on one or more carbon atoms with certain amino groups.

2-chloro-4-(arylamino)-s-triazines have a wide variety of uses. For example, 2,4-dichloro-6-(o-chloroanilino)-s-triazine has been demonstrated to have remarkable fungicidal properties as have many other compounds of this class. Methods previously proposed for the manufacture of such compounds have involved processes whereby one or both of the reactants is dissolved in a reaction solvent. This is detrimental not only from the viewpoint of the original cost of the solvent but also from the viewpoint of time consumed in causing the reactants to dissolve in the solvent. Furthermore, there are other drawbacks which manifest themselves particularly when scale-up to plant size equipment is made. Thus, serious problems of solvent recovery are introduced, and considerable safety problems arise. It is obviously desirable to provide a new method for the preparation of 2-chloro-4-(arylamino)-s-triazines which does not require the time consuming dissolution of reactants and which eliminates the other disadvantages of a solution preparation for this type material.

It is an object of this invention to provide a new and improved process for the manufacture of substituted triazines. More specifically, an object of this invention comprises providing a process suitable for the commercial manufacture of 2-chloro-4-(arylamino)-s-triazines. A specific object is to provide a new and improved process for the manufacture of 2,4-dichloro-6-(chloroanilino)-s-triazine.

The above objects are accomplished by providing a process for the preparation of 2-chloro-4-(arylamino)-s-triazines, which process comprises reacting cyanuric chloride with a substantially water-insoluble aromatic amine, both reactants being intimately dispersed in substantially aqueous reaction medium. Thus, in one embodiment of the present invention, finely dispersed cyanuric chloride is reacted with finely dispersed o-chloroaniline in ice-water medium with good agitation to produce 2,4-dichloro-6-(o-chloroanilino)-s-triazine in yields of greater than 97.5 percent in reaction times no longer than were heretofore required for the acetone-water medium preparation of this compound in much smaller scale.

Not only has it been found surprisingly possible to successfully react cyanuric chloride with water-insoluble amines in substantially aqueous medium in which neither reactant is soluble, but yields have been found to equal or surpass those obtained in the conventional organic solvent-water process. Other advantages, particularly in connection with the physical characteristics of the final product, are also realized.

With other substituted triazines falling within the general description of 2-chloro-4-(arylamino)-s-triazines, similar results are obtained.

The following examples illustrate certain modes of carrying out the process of the present invention.

*Example I*

To a reaction vessel equipped with cooling means and an efficient mechanical agitator was added 400 parts of ice, 400 parts of water which had been precooled to 0° C., and 74 parts of cyanuric chloride. This mixture was agitated for 5 minutes in the presence of 1.5 parts of Marasperse N (a metal salt of a lignin sulfonic acid) to wet the cyanuric chloride, and then 51 parts of o-chloroaniline was added during a 15 minute period. The mixture resulting therefrom was agitated for an additional 10 minutes at 0° C., and then a solution of 16 parts of sodium hydroxide in 144 parts of water was added during a period of 15 minutes. With stirring continued, the reaction mixture was kept at 0° for an additional 10 minutes and then allowed to rise during one hour's stirring to about 15° C. At the end of this time the solids were removed by filtration, washed with 500 parts of dilute hydrochloric acid solution and 500 parts of water, and air dried. In such a procedure yields of over 97.5 percent of 2,4-dichloro-6-(o-chloroanilino)-s-triazine, assaying by infrared analysis greater than 91.2 percent purity, were obtained.

*Example II*

Using the procedure of Example I except that p-chloroaniline is substituted for the o-chloroaniline, equally good results are obtained.

The process of the present invention, in addition to the amines above named, is applicable to a wide variety of other substantially water-insoluble amines, such as aniline; p-phenylaniline; o-phenylaniline; α-naphthylamine; β-naphthylamine; 9-phenanthrylamine; p-toluidine; o-toluidine; 2,4-dimethylaniline; dodecylaniline; o-ethylaniline; p-cumidine; 4-aminohydrindene; 3-aminoacenaphthene; p-vinylaniline; o-propenylaniline; o-vinylaniline; p-allylaniline; p-methallylaniline; 2-vinyl-1-naphthylamine; 5-propenyl-2-naphthylamine; p-bromoaniline; 2,5-dichloroaniline; p-nitroaniline; p-anisidine; p-aminophenol; 4-chloro-1-naphthylamine; o-anisidine; 3-mercaptoaniline; 4-aminoaniline; 3-chloroaniline; 2-dimethylaminoaniline; 4-nitro-2-chloroaniline; 4-dimethylanino-1-naphthylamine; p-(β-chloroethyl)-aniline; p-nitrosoaniline; p-aminoazobenzene; 2,3-dichloro-4-nitroaniline; p-cyanoaniline; p-thiocyanatoaniline; p-acetoxy-o-toluidine; p-benzoyloxyaniline; 4-methylmercaptoaniline; 2-bromoaniline; 3-bromoaniline; 4-bromoaniline; 3-chloroaniline; 2,5-dichloroaniline; 2,4-dichloroaniline; 2-methyl-3-chloroaniline; 2-methyl-5-chloroaniline; N-methylaniline; N-methyl-2,5-dichloroaniline; and the like. In short, any aromatic amine which is water-insoluble, which has at least one hydrogen attached to amino nitrogen (i. e. primary or secondary amine), and which is free of functional groups preferentially reactable with the triazine nucleus is operative in the present invention.

Preferred types of arylamines are those substituted with alkyl, alkyl and halogen, and halogen groups, particularly the latter. Especially preferred amine reactants comprise o-chloroaniline and p-chloroaniline.

When any of the above amines is reacted with cyanuric chloride in the molar ratio of substantially one to one, the product obtained is a 2,4-dichloro-6-(arylamino)-s-triazine in which the arylamino group corresponds to the particular amine reacted. When the reactants are brought together under reactive conditions in the ratio of substantially 2 moles of water-insoluble aromatic amine to one mole of cyanuric chloride, the product obtained is the 2-chloro-4,6-bis-(arylamino)-s-triazine in which the arylamino groups correspond to the aromatic amine reactant. In preparation of the bis-(arylamino)-triazines of this invention it is perfectly feasible to employ a mixture of two or more of the water-insoluble primary or secondary amines, in which case mixtures of products are obtained.

The intimate state of dispersion of reactants which is a feature of the present invention may conveniently be achieved by use of vigorous and thorough agitation as well as by use of surface-active agents. Since use of the surface-active agents is more economical of power, such means is preferred.

Among the surface-active agents are included the anionic, nonionic, or cationic. Such surface-active agent can be chosen, for example, from among the following: alkyl and alkylaryl sulfonates, such as duPont MP-189 and Nacconol-NR; alkyl sulfates, such as Dreft; alkylamide sulfonates, such as Igepon-T; the alkylaryl polyether alcohols, such as Triton X-100; the fatty acid esters of polyhydric alcohols, such as Span; the ethylene oxide addition products of such esters, as, for example, Tween; and the addition products of long-chain mercaptans and ethylene oxide, such as Sharples' Non-Ionic-218. We have further discovered that the type of surface-active agent giving the best results in the present invention is the type which has good dispersing action but causes no substantial lowering of the surface tension of water or aqueous solutions. Good examples of this type of material are metallic salts of lignin sulfonic acids, especially the alkali and alkaline earth metal salts such as sodium and calcium. For some reason the type of surface-active agent which does not substantially lower the surface tension of water gives superior results. Therefore, it is definitely preferred to employ such a surface-active agent. Good results are usually obtained with the amount of dispersing agent varying between about 0.2 percent and 2 percent of the total weight of the reaction mixture.

It is generally preferred to perform the reaction at low temperatures, such as in the range —20 to +20° C., as best yields are obtained in this range. Temperatures otbained by using substantially equal mixtures of ice and water as the initial reaction medium are very satisfactory.

Although not necessary to the present invention, it is usually desirable to conduct at least a portion of the reaction in the presence of an alkaline agent. Use of such an agent facilitates completion of the reaction due primarily to its aid in abstracting hydrogen chloride from the two reactants. When such an agent is used, it is generally preferred to permit the cyanuric chloride and the aromatic amine to react for a finite period of time, such as 5 minutes, before addition of the alkaline agent, then to add the alkaline agent and permit reaction to further proceed. Yields are somewhat better following this procedure than when the alkaline agent is added prior to the addition of the amine. The alkaline agent need not be sodium hydroxide but can be any alkaline material such as sodium carbonate, sodium bicarbonate, calcium oxide, calcium hydroxide, potassium hydroxide, barium carbonate, and the like. We prefer to permit our reactants to react in contact with each other for periods of at least 30 minutes, preferably an hour to two hours. The amount of alkaline agent should be about 1 mole per every chlorine atom to be replaced by arylamino in the cyanuric chloride.

If desired, the product from this reaction can be subjected to preliminary drying by washing with a water-soluble, low boiling solvent such as a lower alcohol or a lower ketone; viz. methanol, acetone, and the like. The product can also be recrystallized from an organic solvent, preferably an aromatic hydrocarbon or halide such as benzene, toluene, chlorobenzene, o-dichlorobenzene, trichlorobenzene, and the like.

Although not critical, the ratios of reactants preferably employed are substantially one mole of aromatic amine per mole of cyanuric chloride for every anilino group that is intended to be introduced into the triazine nucleus. The optimum amount of amine employed varies from about 0.8 moles to 1.2 moles per mole of cyanuric chloride in the case of monosubstitution and is about twice that amount for di substitution.

It is to be understood that the above described process is applicable not only to the preparation of the substituted triazines specifically mentioned above, but it is broadly applicable to any 2-chloro-4-(arylamino)-s-triazine which is prepared from a substantially water-soluble aromatic amine. This includes the 2,6-dichloro-4-(arylamino)-s-triazines as well as the 2-chloro-4,6-di-(arylamino)-s-triazines. In the latter instance the two arylamino radicals can be the same or different. Specific examples of triazines that can be made by our process include 2,4-dichloro-6-(anilino)-s-triazine; 2,4-dichloro-6-(p-phenylanilino)-s-triazine; 2,4-dichloro-6-(β-naphthylamino)-s-triazine; 2,4-dichloro-6-(p-toluidino)-s-triazine; 2,4-dichloro-6-(2,4-dimethylanilino)-s-triazine; 2,4-dichloro-6-(3-mercaptoanilino)-s-triazine; 2,4-dichloro-6-(p-nitroanilino)-s-triazine; 2,4-dichloro-6-(3-bromoanilino)-s-triazine; 2,4-dichloro-6-(N-methylanilino)-s-triazine; and the like. Examples of typical products of the 2-chloro-4,6-di-(arylamino)-s-triazine type include 2-chloro-4,6-bis-(anilino)-s-triazine; 2-chloro-4,6-bis-(p-chloroanilino)-s-triazine; 2-chloro-4,6-bis-(o-chloroanilino)-s-triazine; 2-chloro-4,6-bis-(o-ethylanilino)-s-triazine; 2-chloro-4,6-bis-(p-cumidino)-s-triazine; 2-chloro-4,6-bis-(p-nitrosoanilino)-s-triazine; 2-chloro-4,6-bis-(4-nitro-2-chloroanilino)-s-triazine; 2-chloro-4,6-bis-(4-methylmercaptoanilino)-s-triazine; 2-chloro-4,6-bis-(2,4-dichloroanilino)-s-triazine; 2-chloro-4,6-bis-(2-chloro-4-methylanilino)-s-triazine; 2-chloro-4-(anilino)-6-(o-chloroanilino)-s-triazine; 2-chloro-4-(o-chloroanilino)-6-(p-chloroanilino)-s-triazine; 2-chloro-4-(p-toluidino)-6-(o-chloroanilino)-s-triazine; 2-chloro-4-(p-anisidino)-6-(p-hydroxyanilino)-s-triazine; 2-chloro-4-(4-bromoanilino)-6-(2-chloroanilino)-s-triazine and the like.

The above and many other products capable of being prepared by the present invention have a variety of uses as chemical intermediates, pesticides, particularly fungicides, intermediates for dyestuff manufacture, and for the manufacture of pharmaceuticals, etc.

What is claimed is:

1. In a process for the preparation of a material selected from the group consisting of 2-chloro-4,6-arylamino-s-triazine and 2,4-dichloro-6-arylamino-s-triazine, comprising reacting cyanuric chloride with a substantially water-insoluble aromatic amine wherein said aromatic portion is selected from the group consisting of phenyl, naphthyl, alkyl phenyl, halo phenyl and alkyl halo phenyl groups and having at least one hydrogen attached to the amino nitrogen, the improvement which comprises intimately dispersing both reactants in substantially aqueous reaction medium containing as a surface active agent a metal salt of lignin sulfonic acid in an amount between about 0.2 and 2.0 weight percent of the total reaction mixture and conducting the reaction for a period of 30 minutes to 2 hours.

2. The process of claim 1 further characterized in that the reaction temperature is maintained between —20° C. and +20° C. and wherein said cyanuric chloride and said amine are first reacted for an initial period of at least 5 minutes and then is added an alkaline agent in the ratio of substantially 1 mole per each chlorine atom in said cyanuric chlorine to be replaced with arylamino, reacting said materials for a period of 30 minutes to 2 hours, and thereafter recovering a 2,4-dichloro-6-(arylamino)-s-triazine from the reaction mixture.

3. In a process for the preparation of 2,4-dichloro-6-(o-chloroanilino)-s-triazine by reacting 1 mole of cyanuric chloride with substantially 1 mole of o-chloroaniline, the improvement which comprises intimately dispersing both reactants in substantially aqueous reaction medium containing as a surface active agent a metal salt of lignin sulfonic acid in amount between about 0.2 and 2.0 weight percent of the total reaction mixture and conducting the reaction for a period of 30 minutes to 2 hours.

References Cited in the file of this patent

UNITED STATES PATENTS

| | | |
|---|---|---|
| 1,625,530 | Fritzsche | Apr. 19, 1927 |
| 2,296,823 | Pollack | Sept. 22, 1943 |
| 2,720,480 | Wolf | Oct. 11, 1955 |

OTHER REFERENCES

Banks Journ. of the American Chem. Soc., vol. 66, page 1127 (1944).

Friedheim Journ. of the American Chem. Soc., vol. 66, pp. 1775–1777.

Groggins Unit Processes in Organic Synthesis, pages 377 and 378, 1947.

Modern Plastics, by Barron, 1949, pages 424 and 425.